Oct. 14, 1958      A. A. DICK      2,856,149
IRRIGATION GATE
Filed May 8, 1957
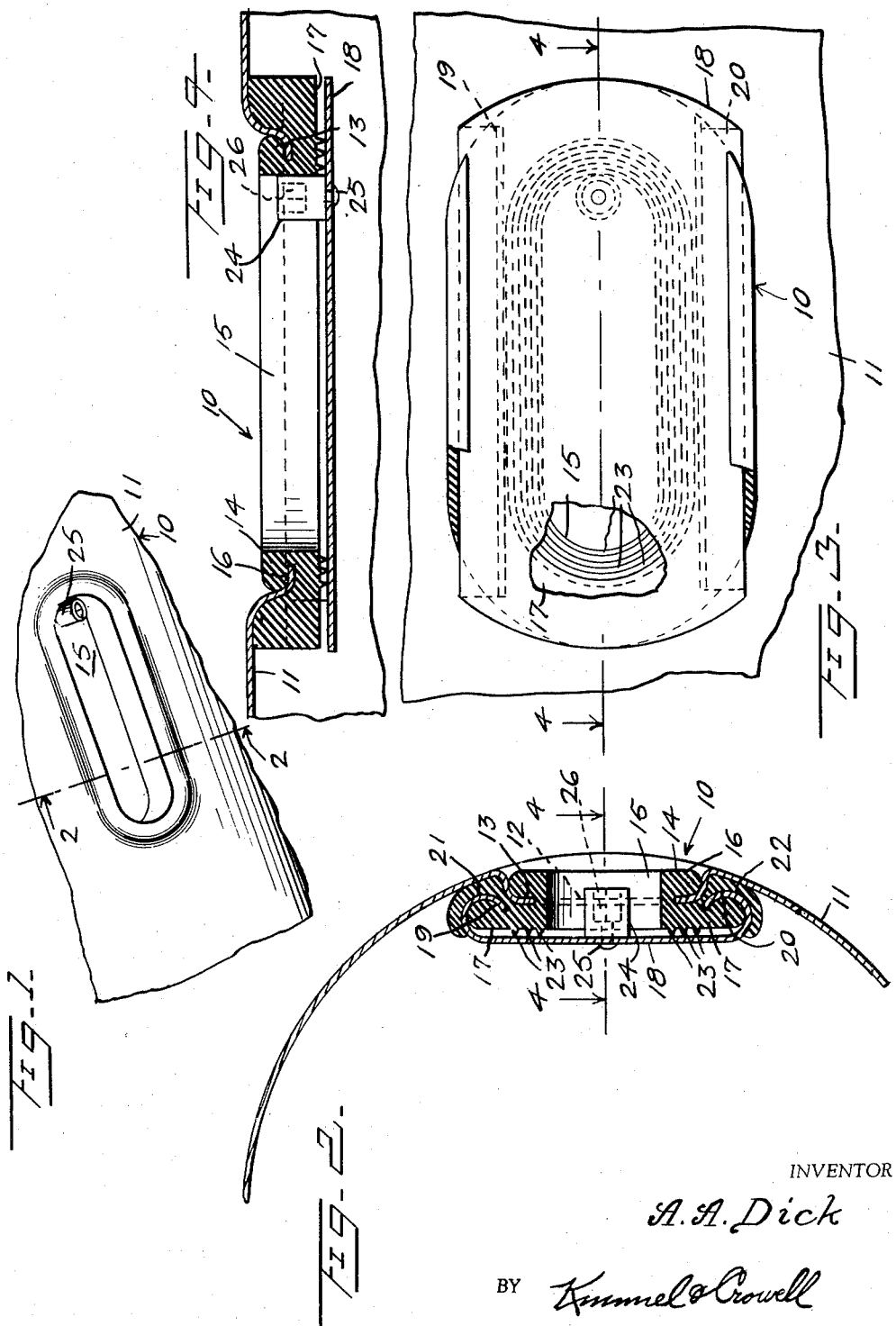
INVENTOR
A. A. Dick
BY Kimmel & Crowell
ATTORNEYS

United States Patent Office 2,856,149
Patented Oct. 14, 1958

2,856,149

IRRIGATION GATE

August A. Dick, Henderson, Nebr., assignor to Irrigation Manufacturing Co., Henderson, Nebr., a corporation of Nebraska Application May 8, 1957, Serial No. 657,842

1 Claim. (Cl. 251—145)

The present invention relates to irrigation gates, and more particularly to gate valves mounted in irrigation conduits for feeding water to irrigation ditches extending laterally therefrom.

The primary object of the invention is to provide an irrigation gate which can be installed from the exterior of the irrigation pipe without the use of special tools.

Another object of the invention is to provide an irrigation gate of the class described in which the gate can be actuated by means extending outside of the irrigation pipe.

A further object of the invention is to provide an irrigation gate of the class described above in which the water pressure within the pipe assists in sealing the gate to the pipe.

A still further object of the invention is to provide an irrigation gate for installation in an irrigation pipe line which is inexpensive to manufacture, simple to use, and which is completely effective in its action.

Other objects and advantages will become apparent in the following specification when considered in the light of the attached drawings, in which:

Figure 1 is a perspective view of the invention shown attached to an irrigation pipe line, partially broken away for convenience of illustration.

Figure 2 is an enlarged fragmentary vertical cross-section taken along the line 2—2 of Figure 1, looking in the direction of the arrows.

Figure 3 is an internal side elevation illustrating the gate in closed position, shown partly broken away and in section for convenience of illustration.

Figure 4 is a longitudinal cross-section taken along the lines 4—4 of Figures 2 and 3, looking in the direction of the arrows.

Referring now to the drawings in detail wherein like reference characters indicate like parts throughout the several figures, the reference numeral 10 indicates generally an irrigation gate constructed in accordance with the invention and installed in an irrigation pipe 11.

The irrigation pipe 11 is provided with a longitudinally extending oval opening 12 having an inwardly recessed peripheral lip 13 extending therearound. A rubber body 14 is provided with an oval opening 15 extending therethrough having the same general shape as the opening 12 in the pipe 11 and being of a slightly smaller dimension. The rubber body 14 is provided with an annular torturous slot 16 to engage over the lip 13 on the pipe 11 to secure the rubber body 14 to the pipe 11 in surrounding relation to the opening 12 therein.

The rubber body 14 has a generally flat inner surface 17 extending perpendicularly outwardly from the opening 15 to provide a base for an irrigation valve plate, generally indicated at 18, to engage against. The irrigation valve plate 18 is formed generally flat and has its opposite longitudinal edges inwardly coiled at 19 and 20, as best shown in Figure 2. The opposite longitudinal edges of the rubber body 14 are provided with arcuate slots 21, 22, respectively, in which the coiled edges 19, 20 of the plate 18 engage for sliding movement.

The flat surface 17 is provided with a plurality of annular V ribs 23 projecting outwardly for sealing engagement with the plate 18.

The plate 18 is provided with a combined actuator handle and limit stop plug 24 extending outwardly into the opening 15 in the body 14 and secured to the plate 18 by a rivet 25. The plug 24 is recessed at 26 to receive a tool (not shown) for sliding the plate 18 with respect to the opening 15. The plug 24 is adapted to engage one end of the opening 15 when the plate 18 is in fully closed position, and to engage the other end of the opening 15 when the plate 18 is in fully open position.

In the operation of the invention, the coiled edges 19 and 20 form a sliding contact engaging in the grooves 21, 22 simultaneously gripping the body 14 to prevent the body 14 from being forced outwardly dislodging it from the opening 12 in the irrigation pipe 11.

Having thus described the preferred embodiment of the invention, it should be understood that numerous structural modifications and adaptations may be resorted to without departing from the scope of the appended claim.

What is claimed is:

A gate structure for an irrigation pipe of the type having an inwardly recessed lip surrounding a longitudinally extending oval opening comprising an oval rubber body having a substantially flat inner face and a gently sloping outer face, said body having a central oval opening extending therethrough and having an inwardly directed slot extending around the outer face thereof, said lip engaging in said slot, said body having a larger dimension than said opening in said pipe and a portion of the outer face thereof engaging against the inner surface of said pipe adjacent said lip, said body having a pair of elongated longitudinally extending arcuate slots in the inner face adjacent the longitudinal edges thereof, seating means formed integrally on and extending laterally from the inner face of said body, said seating means being disposed about said oval opening in said body in concentric relation thereto and the major portion thereof being disposed outwardly of the inner edge of said lip, an elongated flat plate, said plate having a pair of integrally formed coiled longitudinal edges, each of said edges of said plate being slidably engaged in a respective one of said arcuate slots for moving said plate into and out of registry with said oval opening in said body, said plate engaging said seating means in sealing relation when said gate is in closed position, and a combined handle and limit stop plug secured to said flat plate and extending into the oval opening in said rubber body.

References Cited in the file of this patent

UNITED STATES PATENTS

| 2,074,607 | Frey | Mar. 23, 1937 |
| 2,200,113 | Horn | May 7, 1940 |
| 2,499,738 | Folsom | Mar. 7, 1950 |
| 2,771,904 | Sherman | Nov. 27, 1956 |